United States Patent Office.

CHARLES S. HALLBERG, OF CHICAGO, ILLINOIS, ASSIGNOR TO WHEELER CHEMICAL WORKS.

SACCHARATED EXTRACTS.

SPECIFICATION forming part of Letters Patent No. 242,531, dated June 7, 1881.

Application filed April 23, 1880. (Specimens.)

*To all whom it may concern:*

Be it known that I, CHARLES S. HALLBERG, of Chicago, State of Illinois, have invented a new and useful Improvement in Saccharated Extracts, which improvement is fully described in the following specification.

This invention relates to those extracts of vegetable substances usually employed as medicines. An ordinary fluid extract is first made by repercolation with an appropriate solvent. This solution is evaporated to complete or nearly complete dryness at a low temperature and the percentage yield noted. To this dry or nearly dry extract, after being pulverized, there is added such an amount of milk-sugar in powder as will exactly replace and represent the inert and insoluble matter left in the percolator.

If the extract contains an alkaloid, the percentage of this is obtained by chemical analysis, so that upon the label of the finished preparation the amount of solid extract contained and also the percentage of alkaloid can be definitely stated.

For milk-sugar I can use, if desired, though the product is less satisfactory, cane-sugar, starch, dextrine, or other innocent soluble vehicle of a solid character.

I am aware that some or all of these substances have been used as admixtures in solid extracts, and therefore do not claim to have originated their use.

What I do claim is—

A soluble medicinal preparation consisting of the soluble matter of a vegetable therapeutic agent mixed with precisely the amount of sugar equal to the insoluble inefficient constituents of the plant employed.

CHARLES S. HALLBERG.

Witnesses:
FREDERICK C. GOODWIN,
HENRY S. TOWLE.